No. 667,238. Patented Feb. 5, 1901.
J. MANNING.
CHANGEABLE SPEED GEAR FOR BICYCLES.
(Application filed Apr. 24, 1900.)
(No Model.) 2 Sheets—Sheet 2.
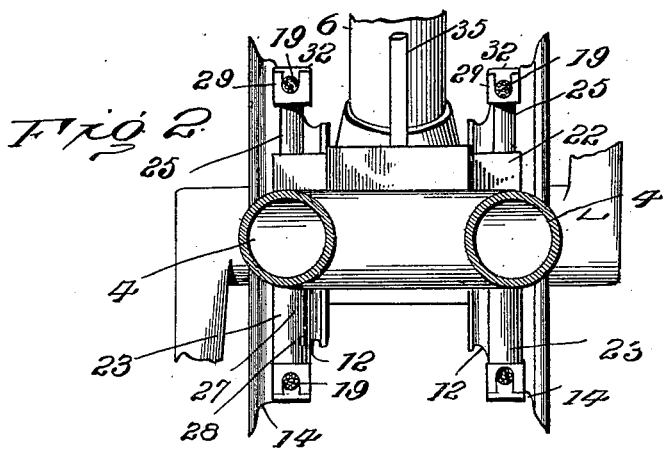
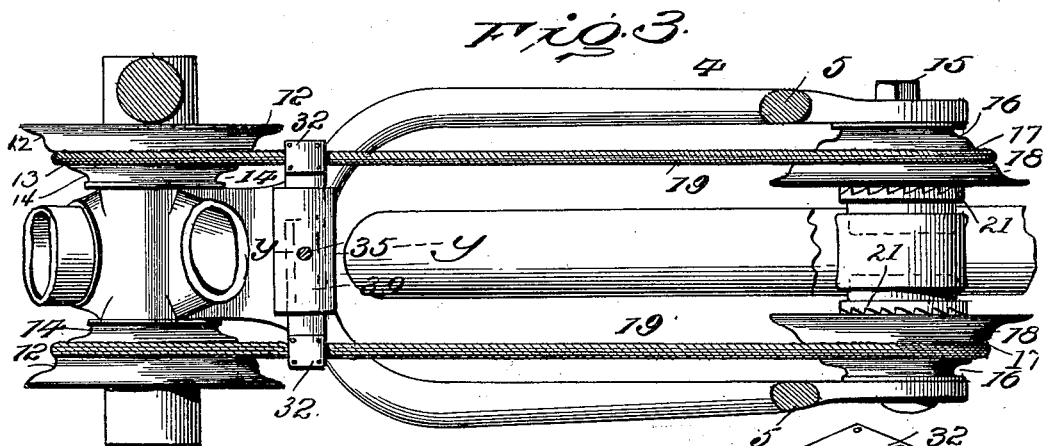
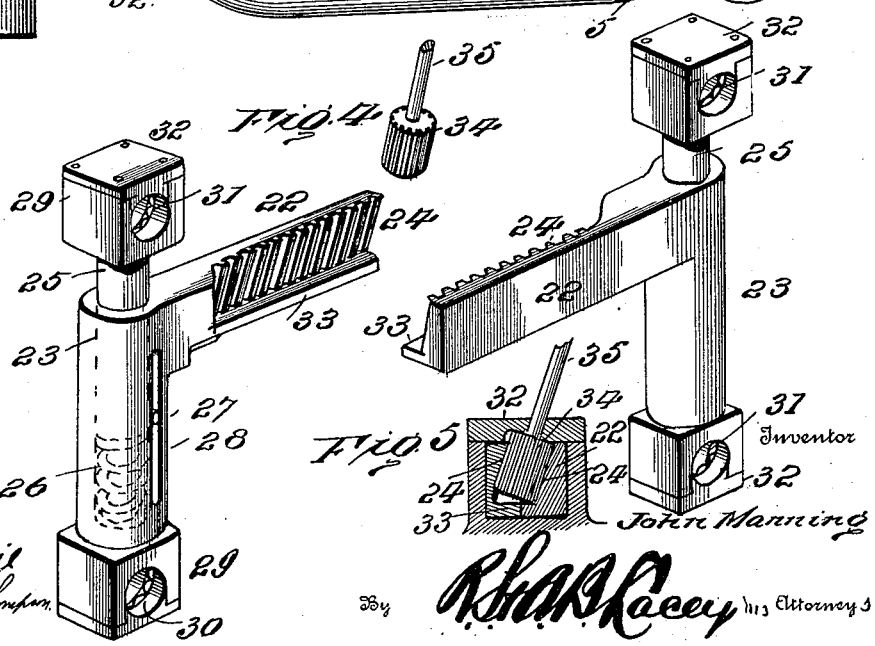

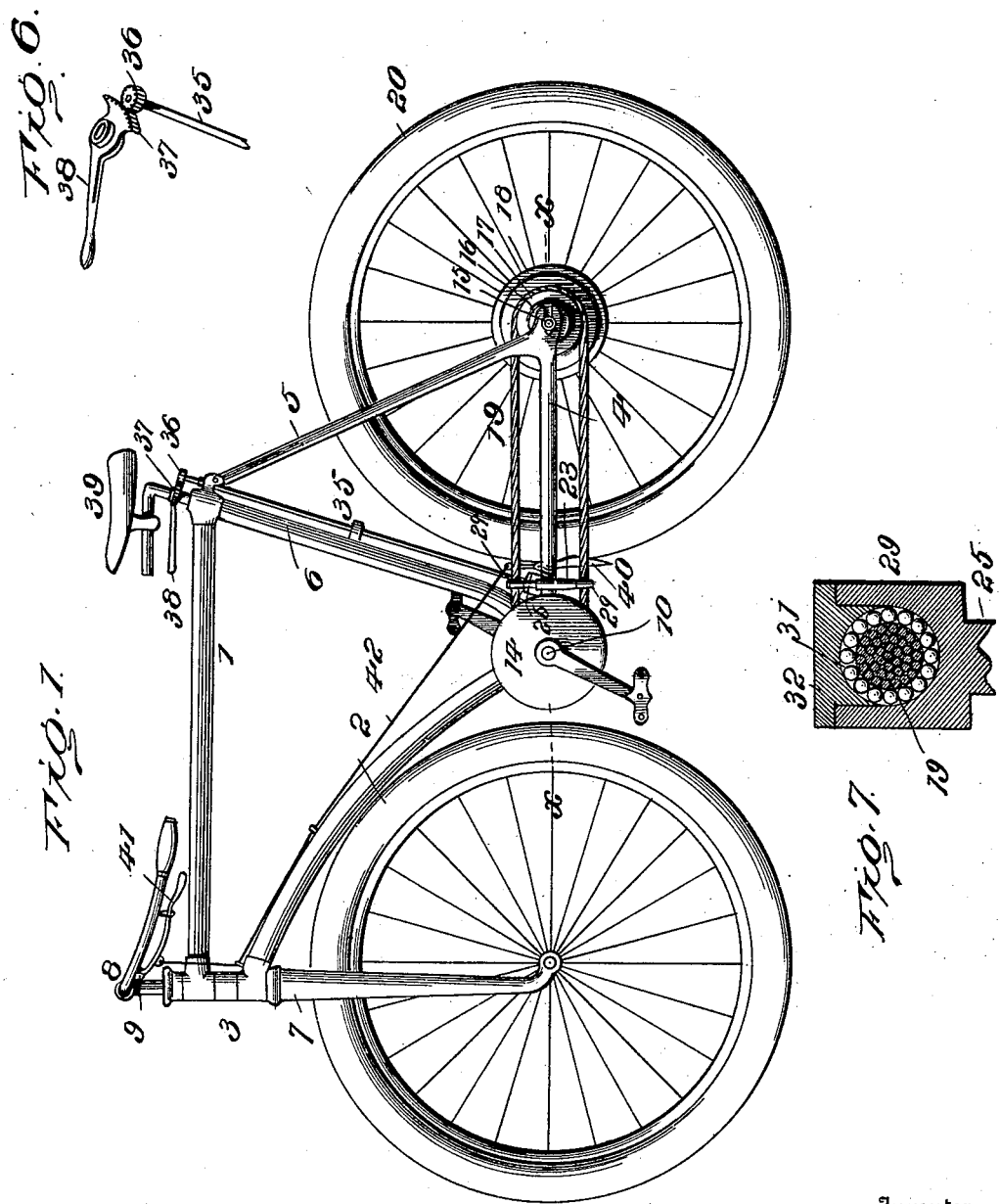

UNITED STATES PATENT OFFICE.

JOHN MANNING, OF AGENDA, KANSAS.

CHANGEABLE-SPEED GEAR FOR BICYCLES.

SPECIFICATION forming part of Letters Patent No. 667,238, dated February 5, 1901.

Application filed April 24, 1900. Serial No. 14,142. (No model.)

*To all whom it may concern:*

Be it known that I, JOHN MANNING, a citizen of the United States, residing at Agenda, in the county of Republic and State of Kansas, have invented certain new and useful Improvements in Changeable-Speed Gear for Bicycles; and I do hereby declare the following to be a full, clear, and exact description of the invention, such as will enable others skilled in the art to which it appertains to make and use the same.

This invention belongs to the class of machines of the bicycle type, and has relation more particularly to the drive-gear, whereby the device is propelled with equal ease upgrade, over rough and sandy surfaces, and on level and smooth roads. The drive-gear is of the changeable kind, and comprises slow, ordinary, and fast speeds, the change being effected from one to the other without requiring dismounting or stopping.

For a full description of the invention and the merits thereof and also to acquire a knowledge of the details of construction of the means for effecting the result reference is to be had to the following description and drawings hereto attached.

While the essential and characteristic features of the invention are necessarily susceptible of modification, still the preferred embodiment of the invention is illustrated in the accompanying drawings, in which—

Figure 1 is a side elevation of a bicycle, showing the application of the invention thereto. Fig. 2 is a vertical transverse section of the lower portion of the frame looking toward the front. Fig. 3 is a horizontal section about on the line X X of Fig. 1. Fig. 4 is a detail view in perspective of the instrumentalities for shifting the drive-belts from one set of pulleys to the other. Fig. 5 is a transverse section about on the line Y Y of Fig. 3. Fig. 6 is a detail view in perspective of the means for operating the shippers. Fig. 7 is a sectional detail of one of the heads of a shipper.

Corresponding and like parts are referred to in the following description and indicated in all the views of the drawings by the same reference characters.

The frame of the machine comprises the upper run 1, the lower reach 2, the head-tube 3, rear fork 4, backstays 5, and the diagonal or seat-post tube 6. The head-tube 3 is vertically disposed, and the front fork 7 is perpendicular, with the lower ends of its side members rearwardly curved and receiving the axle of the front wheel. The handle-bar 8 is attached to the steering-post 9 in the usual manner. By having the steering-post and front fork vertically disposed the machine is more tractable and can be steered with greater ease. The crank-axle 10 is journaled in the crank-hanger in an approved fashion and is provided at opposite ends with a series of grooved pulleys 12, 13, and 14, constructed of a single piece or a number of parts secured so as to operate as a unitary part. The pulleys 12, 13, and 14 are of different diameters, the latter depending upon the required speeds. The rear axle 15 has its end portions provided with pulleys 16, 17, and 18, inversely disposed to the pulleys 12, 13, and 14 and of such relative diameters as to enable the drive-belts 19 to coöperate with any set of pulleys without requiring to be tightened or loosened. The pulleys 16, 17, and 18 may be integrally formed or composed of separate parts and are loosely mounted upon the axle 15, so as to admit of the drive-wheel 20 rotating when the machine is under headway and the pedals are held stationary. A clutch 21 is interposed between the respective sets of pulleys and the hub of the rear wheel, so as to make positive connection when it is required to impart movement to the drive-wheel from the pedals through the intermediate connections. The drive-belts 19 may be of any construction and are preferably formed of coiled wire normally under tension, so as to maintain proper engagement with the pulleys to effect a positive transmission of power.

Means are required for shifting the drive-belts from one set of pulleys to the other, and consists of shippers relatively movable in opposite directions, which is essential to shift the belts from one set of pulleys to another, so that they will occupy a corresponding position. Each shipper consists of a horizontal bar 22, having a sleeve 23 at its outer end and toothed upon its inner side, as shown at 24, and a member 25, telescopically related with reference to the sleeve 23. A spring 26 is located in the sleeve 23 and is of the retractile type and is secured at one end to the part 23 and at its opposite end to the part 25, so as to normally draw the parts together. A pin 27, applied to the part 25, is arranged to operate in a slot 28 of the sleeve 23 to prevent outward displacement of the part 25 and turning thereof in the sleeve 23. Heads 29 of similar construction are provided at the outer ends of the parts 23 and 25 and are apertured, as shown at 30, for the passage of the parts of the drive-belts. The apertures or openings 30 flare from a middle point toward opposite ends, and in order to reduce the friction between the drive-belts and the said heads the latter are fitted with antifriction-balls 31 at the medial or contracted part of the openings 30. Cap-plates 32 are secured to the heads 29 so as to admit of the drive-belts being passed into the openings 30 and of the balls 31 being fitted into their respective raceways. The bars 22 overlap and their toothed sides 24 incline from the vertical to correspond with the inclination of the seat-post tube 6. Flanges 33 are provided at the lower edges of the bars 22 and hold the toothed parts 24 apart, so as to prevent their crowding against opposite sides of the pinion 34, secured to the lower end of the shaft 35, journaled in bearings applied to the seat-post tube 6. A pinion 36 is made fast to the upper end of the shaft 35 and is in mesh with a toothed segment 37 at the rear end of an operating-lever 38, journaled upon the upper portion of the tube 6, or a boss in line therewith. This lever 38 is located beneath the seat 39 within convenient reach of the rider, so as to be operated to shift the drive-belts from one set of pulleys to the other, according as power, ordinary speed, or racing speed is required. The bars 22 are slidably mounted in a casing 39, located adjacent to the crank-hanger and connecting the forward ends of the rear fork sides.

In order to control the speed of the machine when going downgrade or when it is required to slow down, a brake 40 of the spoon type is provided and disposed to bear against the front side of the drive-wheel, and this brake is adapted to be operated from the brake-lever 41 by means of the intermediate connection 42. When coasting or resting upon the pedals, the speed of the machine can be controlled by a proper application of the brake, which latter is at all times under control of the rider without requiring the removal of the hands from the grips, since the brake-lever 41 extends within convenient reach of the hand when grasping the grip. The distance apart of the upper and lower portions of the drive-belts depends upon which of the pulleys the drive-belts are fitted to, and in order that the outer or vertical portions of the shippers may occupy a minimum space they are constructed substantially in the manner set forth, so as to adapt the position of the heads to the distance apart of the upper and lower portions of the drive-belts.

When the drive-belts are upon the pulleys 14, the heads 29 of corresponding shippers are separated a minimum distance, and when the drive-belts are fitted to the pulleys 12 the said heads are separated a maximum distance. It will thus be seen that the heads accommodate themselves to the position of the drive-belts. For power, as when climbing a hill or riding over rough and sandy surfaces, the drive-belts are shifted so as to engage with the pulleys 14 and 18, and for ordinary riding the drive-belts pass around the pulleys 13 and 17, and for racing speed the drive-belts pass around the pulleys 12 and 16. The shifting of the drive-belts can be readily effected at any time without requiring the rider to dismount or bring the machine to a stop or in anywise slacken the speed. By having the heads 29 of the shippers normally drawn together by the retractile springs 26 the shippers serve in the capacity of belt-tighteners and automatically take up any slack in the belts, as will be readily understood.

Having thus described the invention, what is claimed as new is—

1. In drive-gear for bicycles and the like, a series of pulleys of different diameters applied to the end portions of the crank-axle and the axle of the drive-wheel in inverse order, drive-belts for the respective sets of pulleys, shippers for the respective drive-belts, and means under control of the rider for simultaneously moving the shippers in opposite directions, substantially as set forth.

2. In drive-gear for bicycles and the like, pulleys of different diameters applied to the end portions of the crank-axle and the axle of the rear drive-wheel side, drive-belts cooperating with the respective sets of pulleys, shippers for the drive-belts having inwardly-extended overlapped horizontal bars toothed upon their opposing sides, a shaft having a pinion in mesh with the toothed bars, and means within convenient reach of the rider for turning the shaft to move the shippers simultaneously in opposite directions, substantially as specified.

3. In drive-gear for bicycles and the like, pulleys of different diameters applied to the end portions of the crank-axle and the axle of the rear drive-wheel side, drive-belts cooperating with the respective sets of pulleys, shippers for the drive-belts having inwardly-extended overlapped horizontal bars toothed upon their opposing sides and having forwardly-extending flanges to maintain a fixed distance between the toothed sides of said bars, a shaft having a pinion in mesh with the toothed bars, and means within convenient reach of the rider for turning the shaft to move the shippers simultaneously in opposite directions, substantially as specified.

4. In drive-gear for bicycles and the like, pulleys of different diameters applied to the crank-axle and the axle of the drive-wheel and inversely disposed, a drive-belt coöperating with the respective pulleys, and a shipper having extensible parts engaged with, respectively, the upper and the lower parts or runs of the drive-belt, substantially as set forth.

5. In drive-gear for bicycles and the like, pulleys of different diameters applied to the crank-axle and the axle of the drive-wheel and inversely disposed, a drive-belt coöperating with the respective pulleys, a shipper composed of slidably-related parts adapted to engage with the upper and the lower parts or runs of the drive-belt, and a retractile spring connecting the parts of the shipper, substantially as specified.

6. In drive-gear for bicycles and the like, pulleys of different diameters applied to the crank-axle and the axle of the drive-wheel and inversely disposed, a drive-belt coöperating with the respective pulleys, a shipper composed of slidably-related parts adapted to engage with opposite portions of the drive-belt, heads applied to the outer ends of the said parts and having openings for the passage of the portions of the drive-belt, said openings being oppositely flared from a central point and provided with antifriction devices, and means for drawing the parts together, substantially as set forth.

7. In drive-gear for bicycles and the like, pulleys of different diameters secured to the end portions of the crank-axle and the axle of the drive-wheel and disposed in inverse order, drive-belts for the respective pulleys, shippers comprising horizontal portions and vertical telescopically-related parts receiving the upper and lower portions of the respective drive-belts, and means for shifting the shippers laterally in opposing directions, substantially as set forth.

In testimony whereof I affix my signature in presence of two witnesses.

JOHN MANNING. [L. S.]

Witnesses:
W. T. RANSDELL,
J. J. McFADAN.